(12) United States Patent
Yang et al.

(10) Patent No.: US 11,120,640 B1
(45) Date of Patent: Sep. 14, 2021

(54) FUSION METHOD FOR MOVEMENTS OF TEACHER IN TEACHING SCENE

(71) Applicant: Central China Normal University, Hubei (CN)

(72) Inventors: Zongkai Yang, Hubei (CN); Zheng Zhong, Hubei (CN); Di Wu, Hubei (CN); Ke Wu, Hubei (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 17/326,272

(22) Filed: May 20, 2021

(30) Foreign Application Priority Data

Mar. 5, 2021 (CN) .......................... 202110242312.3

(51) Int. Cl.
| | | |
|---|---|---|
| *G06T 19/20* | (2011.01) | |
| *G06T 19/00* | (2011.01) | |
| *G06F 3/01* | (2006.01) | |
| *G09B 9/00* | (2006.01) | |

(52) U.S. Cl.
CPC .............. *G06T 19/20* (2013.01); *G06F 3/013* (2013.01); *G06F 3/016* (2013.01); *G06T 19/003* (2013.01); *G06T 19/006* (2013.01); *G09B 9/00* (2013.01); *G06T 2210/12* (2013.01); *G06T 2210/21* (2013.01); *G06T 2210/28* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2013/0120372 | A1* | 5/2013 | Lee .......................... | G06T 15/00 |
| | | | | 345/419 |
| 2018/0096450 | A1* | 4/2018 | Monk ...................... | A63F 13/33 |
| 2018/0122254 | A1* | 5/2018 | Rangan .................. | H04N 7/142 |
| 2019/0139430 | A1* | 5/2019 | Ghatage ................. | G09B 5/125 |
| 2020/0226941 | A1* | 7/2020 | Kakaraparthy .......... | G09B 5/02 |

FOREIGN PATENT DOCUMENTS

| | | |
|---|---|---|
| CN | 110688005 A | 1/2020 |
| CN | 112230772 A | 1/2021 |

OTHER PUBLICATIONS

V. Interrante, B. Ries and L. Anderson, "Seven League Boots: A New Metaphor for Augmented Locomotion through Moderately Large Scale Immersive Virtual Environments," 2007 IEEE Symposium on 3D User Interfaces, 2007, pp. , doi: 10.1109/3DUI.2007.340791. (Year: 2007).*

Kallonis, Pavlos, and D. Sampson. "Implementing a 3D virtual classroom simulation for teachers' continuing professional development." Proceedings of the 18th International Conference on Computers in Education. 2010. (Year: 2010).*

(Continued)

*Primary Examiner* — Ryan M Gray

(57) ABSTRACT

A fusion method for movements of a teacher in a teaching scene includes normalization, motion perception and fusion of movements. According to interaction needs in an enhanced teaching scene, this application establishes a moving information collection and a conversion of moving position and range to realize the normalization of movement.

4 Claims, 7 Drawing Sheets

(56) References Cited

OTHER PUBLICATIONS

Sharma, Sharad, and Wenhao Chen. "Multi-user VR classroom with 3D interaction and real-time motion detection." 2014 International Conference on Computational Science and Computational Intelligence. vol. 2. IEEE, 2014. (Year: 2014).*

Zhang, Ruimin, Bochao Li, and Scott A. Kuhl. "Human sensitivity to dynamic translational gains in head-mounted displays." Proceedings of the 2nd ACM symposium on Spatial user interaction. 2014. (Year: 2014).*

Sra, Misha, et al. "VMotion: designing a seamless walking experience in VR." Proceedings of the 2018 Designing Interactive Systems Conference. 2018. (Year: 2018).*

* cited by examiner

FUSION METHOD FOR MOVEMENTS OF TEACHER IN TEACHING SCENE

CROSS-REFERENCE TO RELATED APPLICATIONS

This application claims the benefit of priority from Chinese Patent Application No. 202110242312.3, filed on Mar. 5, 2021. The content of the aforementioned application, including any intervening amendments thereto, is incorporated herein by reference in its entirety.

TECHNICAL FIELD

This application relates to information technology-based teaching, and more particularly to a fusion method for movements of a teacher in a teaching scene.

BACKGROUND

A hybrid-augmented teaching scene can not only synchronize and fuse virtual and real scenes with users, but also construct an information loop of interactive feedback between the users and the virtual and real scenes through real-time interaction. The advancement of the $5^{th}$-generation (5G) commercialization and the continuous development of the virtual reality (VR)/augmented reality (AR)/mixed reality (MR) industry realize an effective fusion of multiple motion mechanisms in the hybrid-augmented teaching scene, which is beneficial to enhancing the fusion of information technology and teaching courses. In view of this, it will play an extremely active role in a new generation of three-dimensional teaching environment and has a brilliant application prospect.

Unfortunately, there are some limitations in the fusion of multiple motion mechanisms in the hybrid-augmented teaching scene in the prior art. For example, in the existing hybrid-augmented teaching scene, the real teaching space has the same scale as the virtual teaching space, such that it is difficult to realize the movement gain between different scales, failing to eliminate a contradiction between finiteness of the real teaching space and infiniteness of the virtual teaching space and affecting the realistic experience effect of the interaction. Moreover, when a user experiences a long-time and frequent and movement in the hybrid-augmented teaching scene, motion sickness and disorientation will occur to the user. The existing motion mechanisms distract the user by deviating from reality, which fails to improve the user comfort and attention. In addition, the existing hybrid-augmented teaching scene has insufficient interactive reality, and the motion guidance and sensory feedback cannot fully consider feelings of the user, thereby affecting visual perception and interactive experience of the user.

SUMMARY

An object of this application is to provide a fusion method for movements of a teacher in a teaching scene to overcome the defects in prior art, which provides a new and complete approach for interaction, perception and fusion of the teacher in a hybrid-augmented teaching scene.

Technical solutions of this application are described as follows.

This application provides a fusion method for movements of a teacher in a teaching scene, comprising:

(1) dividing a virtual teaching space into different areas by a Spatial Mapping technology; and calculating a scale transformation of moving position and area of a virtual model and the teacher according to a gain scaling factor of the virtual teaching space and a real teaching space;

(2) constructing a series of motion response rules; adopting a collision detection algorithm and an A* algorithm to realize movement of the virtual model; and enhancing motion perception of the teacher by using prompting modes of a direction arrow, a third-person perspective and a navigation map; and (3) performing a transition between different transmission scenes by adopting transparent gradient modes of texture and colors; support the teacher to select important and difficult contents to explain by a preview screen, an automatic path finding algorithm and a backtracking mechanism; and enhancing fusion representation of the teacher in moving process by adopting a collision feedback, a haptic feedback and a visual feedback.

Compared to the prior art, this disclosure has the following beneficial effects.

A three-dimensional surface model of a real teaching space is collected and is divided into different grid areas. A scale transformation of a moving position and a moving range of a teacher and a moving position and a moving range of a virtual model are calculated according to a gain scaling factor of the real teaching space and the virtual teaching space to realize a movement gain between different scales, eliminating a contradiction between finiteness of the real teaching space and infiniteness of the virtual teaching space, and improving the realistic experience effect of the interaction. Motion response rules are constructed by using a recognition-tracking algorithm to mark movement trigger information of virtual objects. A collision detection algorithm is configured to realize autonomous movement or of the virtual model. A motion perception of the teacher is enhanced by using prompting modes of a direction arrow, a third-person perspective and a navigation map, such that when the teacher experiences a long-time and frequent and movement in a hybrid-augmented teaching scene, motion sickness and disorientation fail to occur to the teacher, thereby improving the teacher comfort and attention. A transition between different transmission scenes is performed by adopting transparent gradient modes of texture and color through setting of a transmit point followed in combination with a preview scene, an automatic path finding algorithm and a backtracking mechanism to support the teacher to select important and difficult contents to explain. Fusion representation of the teacher in moving process is enhanced by adopting a collision feedback, a haptic feedback and a visual feedback to improve interactive authenticity, such that motion guidance and sensory feedback can fully consider feelings of the teacher, thereby improving visual perception and interactive experience of the teacher. The higher demand for a hybrid-augmented teaching brings a higher demand for the fluency, comfort and realistic experience of the teacher's movements in the teaching process. The application can meet the needs of effect of the fusion of movements in the hybrid-augmented teaching scene.

DETAILED DESCRIPTION OF EMBODIMENTS

The present disclosure will be further described in detail with reference to the embodiments and the accompanying drawings to make objects, technical solutions and advantages of the present disclosure better understood. It should be understood that the embodiments presented in the accompanying drawings are merely illustrative of the disclosure, and are not intended to limit the present disclosure. In addition, technical features in the following embodiments can be combined with each other as long as they do not conflict with each other.

Figure 1:
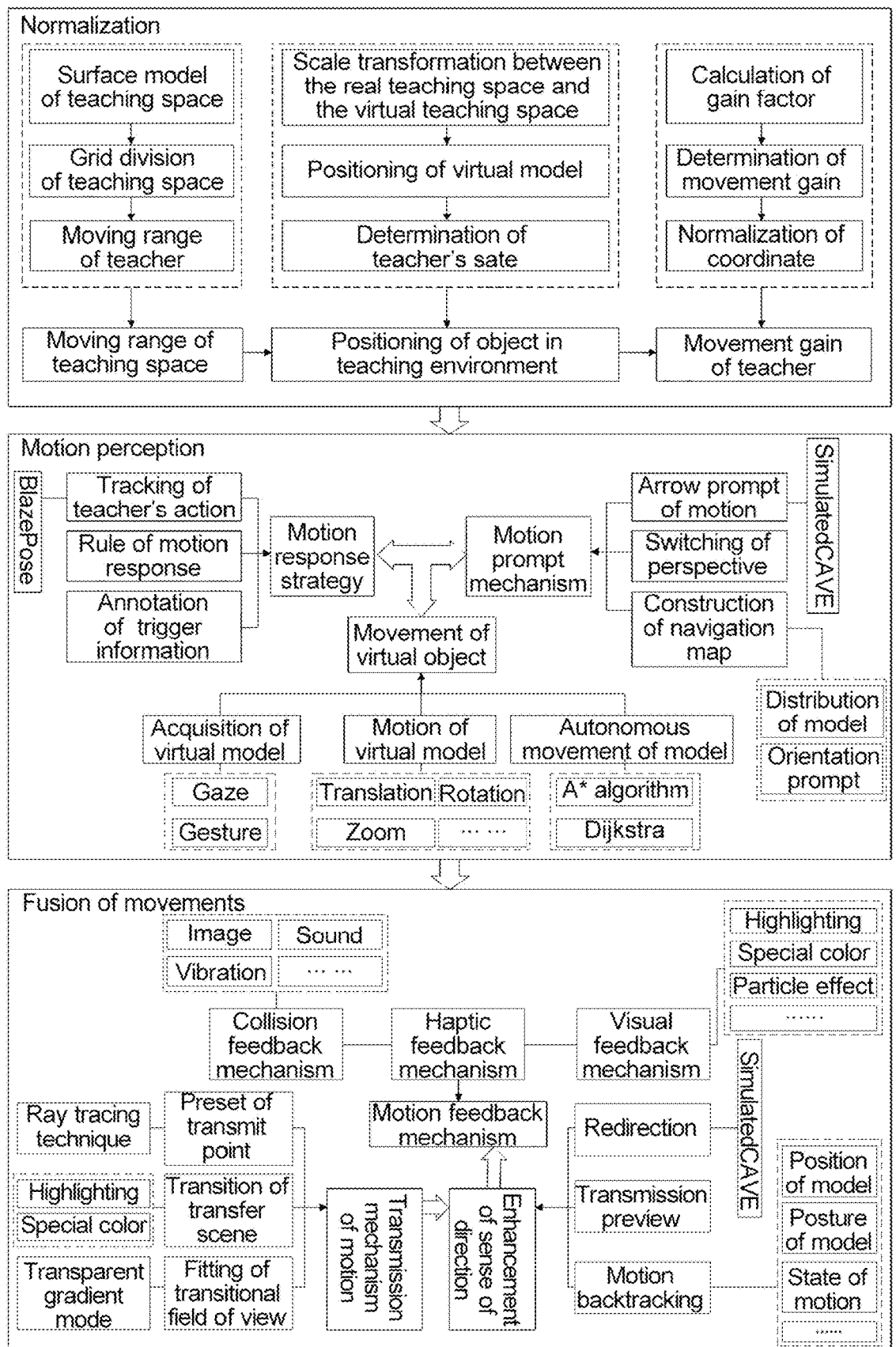
FIG. 1 is a flow chart of a fusion method for movements of a teacher in a teaching scene according to an embodiment of the present disclosure.

As shown in FIG. 1, this application provides a fusion method for movements of a teacher in a teaching scene.

(1) Normalization

A virtual teaching space is divided into different areas by a Spatial Mapping technology. A scale conversion of moving position and area of a virtual model and the teacher is calculated according to a gain scaling factor of the virtual teaching space and a real teaching space.

(1-1) Determination of Moving Range

A three-dimensional (3D) surface model of the real teaching space is collected by a depth camera. The virtual teaching space is divided into different grid areas by the Spatial Mapping technology. A boundary plane of the virtual teaching space is extracted, and a collider is added to the boundary plane to define the moving range of the teacher and the 3D surface model.

(1-1-1) Acquisition of 3D Surface Model of Real Teaching Space

Point cloud data of the real teaching space are collected by the depth camera, such as 3D position and depth value. Grids of a virtual surface model are generated by using a 3D reconstruction technology. The 3D surface model is divided into model objects comprising walls, tables and chairs according to spatial characteristics of the 3D surface model.

(1-1-2) Grid Division of Virtual Teaching Space

Figure 2:
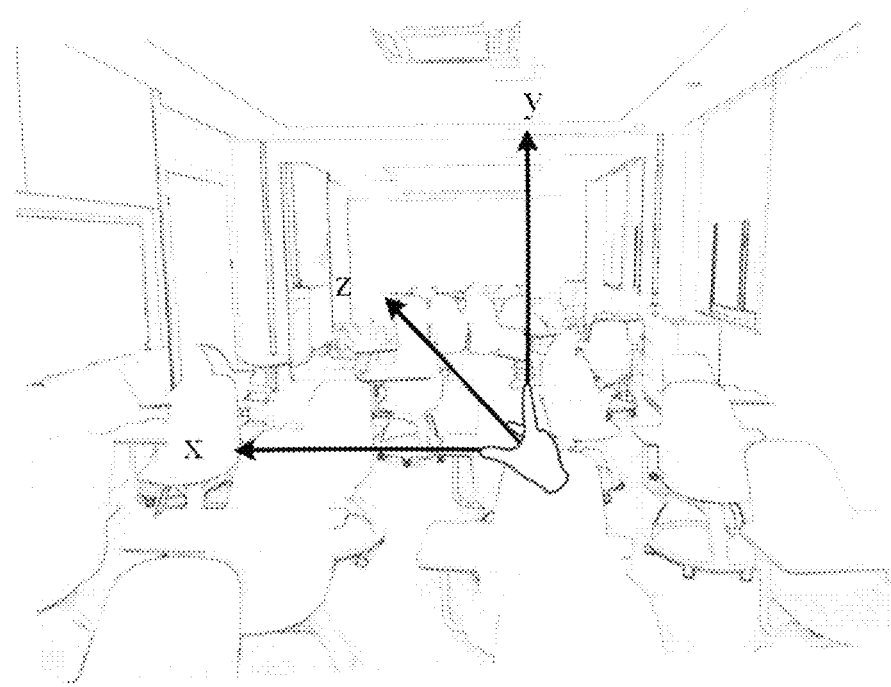
FIG. 2 is a schematic diagram of a world space coordinate system in a virtual teaching space according to an embodiment of the present disclosure.

As shown in FIG. 2, a world space coordinate system is established with meter as unit and a center of the real teaching space as a coordinate origin. The hybrid-augmented teaching environment is described by using a right-handed coordinate system. The virtual teaching space is divided into different grid areas by the Spatial Mapping technology. Virtual objects, such as ceiling, floor, wall, blackboard, podium and desk, in the virtual teaching space are organized based on K-D tree structure, which are divided into different regions and mapped to the world space coordinate system.

(1-1-3) Determination of Moving Range of Teacher and Virtual Object

The boundary planes of the virtual teaching space in horizontal, longitudinal and vertical directions are obtained by traversing to correspondingly create virtual surfaces. Covariance matrixes $C_{ij}$ of each of the boundary planes are calculated. A center point, direction and side length of a bounding volume hierarchy (BVH) box are determined by combining the extreme values of the axes. It is assumed that there are n triangles ($p_k$, $q_k$, $r_k$) in each of the boundary planes ($0 \le k < n$), each of the covariance matrixes $C_{ij}$ is expressed as follow:

$$C_{ij} = \left( \frac{1}{a_H} \sum_{0 \le k < n} \frac{a_k}{12} (9m_{(k,i)}m_{(k,j)} + p_{(k,i)}p_{(k,j)} + q_{(k,i)}q_{(k,j)} + r_{(k,i)}r_{(k,j)}) \right) - m_{(H,i)}m_{(H,j)};$$

where $a_H$ and $m_H$ represent a full area and centroid of each of the boundary plane, respectively; $a_k$ and $m_k$ represent an area and centroid of a triangle k, respectively; $i$ and $j$ represent weight of x and y axes, respectively; and $m_{(k,i)}$ and $m_{(k,j)}$ represent values of centroid $m_k$ on the x and y axes.

The collider of each of the boundary planes is constructed by using BVH-based tree-like hierarchical structure to define the moving range of the teacher and a moving range of a virtual object in the hybrid-augmented teaching environment.

(1-2) Object Position

A scale transformation between the virtual teaching space and the real teaching space is calculated according to the moving range of the teacher and the moving range of the virtual object. A position and an orientation of a virtual model are obtained in the real teaching space by using parallel ranging and imaging. A position and an orientation of the teacher are determined in the real teaching space by using an inertial navigation technology to realize a position conversion between the virtual teaching space and the real teaching space.

Figure 3:
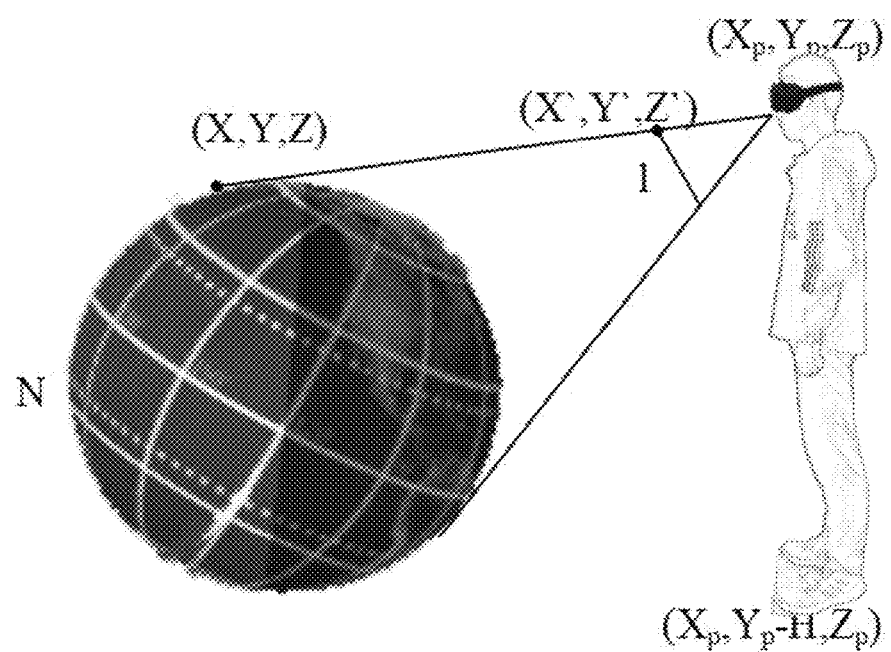
FIG. 3 schematically shows scale transformation of the teacher, model and environment between a real teaching space and a virtual scene according to an embodiment of the present disclosure.

(1-2-1) Realization of Scale Transformation Between Real Teaching Space and Virtual Teaching Space The scale transformation between the virtual scene and the real teaching space is calculated according to the moving range of the teacher and the moving range of the virtual object. A transformation of position and range are enabled between the teacher, the virtual model and environment in the virtual teaching space and the real teaching space by setting a homogeneous coordinate W, where W>1 means zoom out and W<1 means to zoom in. FIG. 3 schematically shows the scale transformation of the teacher, model and environment between a real teaching space and a virtual scene.

(1-2-2) Acquisition of Position and Orientation of Virtual Model

A position coordinate (x, y, z) and an orientation posture (tx, ty, tz) of the virtual model comprising mountain, solar system, magnetic field model are positioned in the real teaching space by using the parallel ranging and the imaging technology. Information of the virtual model is calculated and updated in the real teaching space in real time when the position and orientation of the virtual model change, such as a distance of the teacher with respect to the wall, desk, chair, blackboard, lectern in the virtual objects.

(1-2-3) Acquisition of Position and Orientation of Teacher

A position coordinate (x', y', z') and an orientation posture (tx', ty', tz') of the teacher are calculated in the real teaching space by using the inertial navigation technology with help of an accelerometer and a gyroscope. Changes in the position and the orientation of the teacher are calculated and positioned with respect to surrounding environment by dead reckoning.

(1-3) Movement Gain of Teacher

A weighted calculation is performed to a gain scaling factor in combination with collected distance, speed and time of the movements of the teacher according to the moving range of the teacher and the moving range of the 3D surface model by using an Eye-Level Scaling method. A movement gain of the teacher is calculated in the virtual teaching space by using a Seven-League Boots technology to realize the normalization of the movements of the teacher in the virtual teaching space and the real teaching space.

(1-3-1) Weighted Calculation of Gain Scaling Factor

The weighted calculation is performed to obtain the gain scaling factor according to scale mapping between the virtual teaching space and the real teaching space by using the Eye-Level Scaling method in combination with the collected distance, speed and time of the movements of the teacher to calculate changes in the position and the orientation of the teacher in the virtual teaching space and the real teaching space. For example, the moving data of the teacher in the real environment is collected in the hybrid-augmented teaching environment of solar system sports teaching. Weights of a solar model is set as $P_1$, $P_2$ and $P_3$, respectively, by a factor analysis method according to importance of the solar model in the motion information. The gain scaling factor of the teacher is calculated by weighted combination according to the follow formula:

$$N = f\left(\frac{P_1}{\sum_{i=1}^{3} P_i * S}, \frac{P_2}{\sum_{i=1}^{3} P_i * V}, \frac{P_3}{\sum_{i=1}^{3} P_i * T}\right);$$

where S represents a distance between the teacher and the solar model; V represents a current movement speed of the teacher and T represents an initial scaling factor of the solar model.

(1-3-2) Normalization of Coordinate in Real Teaching Space and Virtual Teaching Space The teacher observes the virtual object in the virtual scene from a giant perspective or a dwarf perspective. A coordinate of the virtual model during the moving process is calculated using a coordinate conversion formula according to parameters of the scale transformation between the virtual teaching space and the real teaching space to realize the normalization of relevant objects in the virtual teaching space and the real teaching space. For example, based on the following conditions: the teacher uses the solar model in a teaching process; the gain scaling factor is known to N; a position coordinate of the solar model in the real teaching space is supposed to be (X, Y, Z); an initial position coordinate of a center point of a head of the teacher in the real teaching space is supposed to be ($X_p$, $Y_p$, $Z_p$); and the teacher has a height of H, a position coordinate (X', Y', Z') of the solar model in the virtual scene is calculated according to the following transformation formula:

$$\begin{cases} X' = (X + (N - 1) * X_p)/N \\ Y' = (Y + (N - 1) * (Y_p - H))/N \\ Z' = (Z + (N - 1) * Z_p)/N \end{cases}.$$

In this embodiment, the virtual teaching space includes a virtual resource, virtual teachers and students and a virtual model.

(1-3-3) Acquisition of Movement Gain

Motion and position data of the teacher are tracked and captured in teaching activities. Changes of field of view of the teacher are followed in the real teaching space. Accumulated position and gesture of the teacher are calculated in the virtual teaching space by using the Seven-League Boots technology to obtain changes of the movement gain of the teacher.

(2) Motion Perception

A series of motion response rules are constructed. A collision detection algorithm and an A* algorithm are adopted to realize movement of the virtual model. Motion perception of the teacher is enhanced by using prompting modes of a direction arrow, a third-person perspective and a navigation map.

(2-1) Construction of Motion Response Policy

Movements of torso, gesture and head of the teacher are captured by using a recognition-tracking algorithm. A series of motion response rules are constructed to unify movement effects in the virtual teaching space and the real teaching space. A moving process of the teacher is marked with a line segment. A selected state of the virtual model is highlighted.

Figure 4:
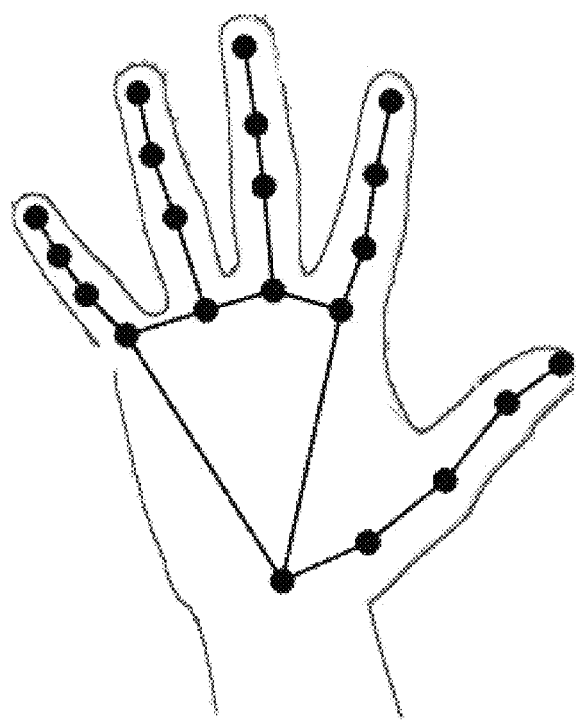
FIG. 4 is a schematic diagram of key points of a gesture of the teacher according to an embodiment of the present disclosure.

(2-1-1) Tracking of Movement of Teacher 33 key points of a body pose of the teacher are positioned by an assembly line attitude estimation method. The torso posture and movements of the teacher are tracked in a teaching process by using a BlazePose algorithm to accurately identify movement behavior of the teacher's body. The head movements are tracked by using a head pose estimation, such as raising head, shaking head and turning head. Head behaviors of the teacher are recognized by adopting a facial key point detection model. 21 bone nodes of teacher's palm, fingertips and joints of phalanx are tracked in real time by using a MediaPipeHands detection technology of key points of hand. As shown in FIG. 4, hand movements of the teacher are perceived in the teaching process by a BlazePlam gesture recognition algorithm.

(2-1-2) Construction of Motion Response Rule

Figure 5:
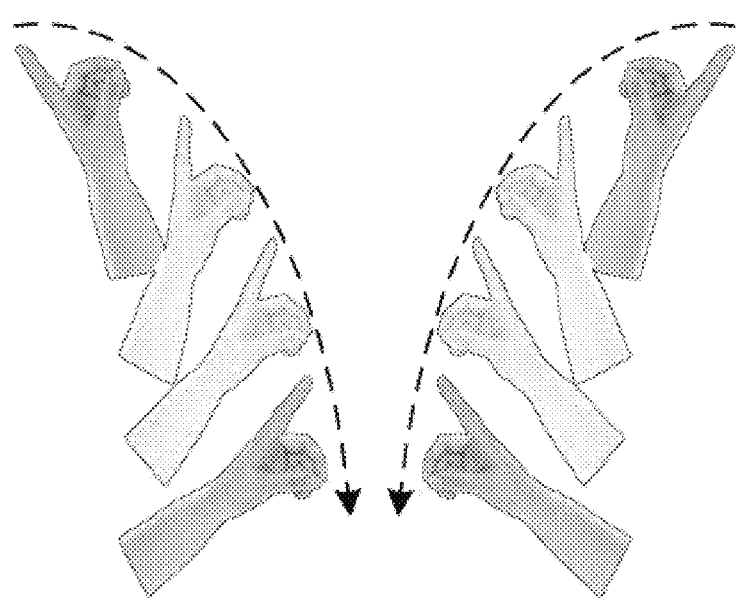
FIG. 5 is a schematic diagram of a gesture of the teacher to stimulate a movement gain according to an embodiment of the present disclosure.

The motion response rules are constructed in the hybrid-augmented teaching environment according to collected movement actions of the teacher, such as walking, swinging arms, grasping, raising head. As shown in FIG. 5, the teacher rotates index fingers of left and right hands by more than 45° clockwise and counterclockwise, respectively at the same time. Such gesture stimulates the Seven-League Boots technology to enhance the movement effects of the teacher in an interactive process of the virtual scene.

(2-1-3) Annotation of Movement Trigger Information

Actions of the teacher are tracked in the real teaching space, and a moving path of the teacher is dynamically displayed in real time by using a LineRender drawing method in the virtual scene. When a sight line and a gesture of the teacher move to the collider of the virtual model, the virtual model is highlighted to trigger a prompt of the selected state.

(2-2) Motion Mechanism of Virtual Model

The virtual model is selected by using an external bounding box detection algorithm. The virtual model is prevented from passing through relevant virtual objects during the moving process by using a collision detection algorithm. The virtual model avoids obstacles in the virtual scene by using an A* algorithm. The virtual model autonomously moves by using a 3D Dijkstra algorithm.

(2-2-1) Acquisition of Virtual Model

The teacher chooses the virtual model in a virtual environment by interactive modes of gaze and gesture according to teaching needs. The virtual model is selected by using the external bounding box detection algorithm when the collision is detected between the teacher and the BVH box of the virtual model. The selected virtual model is highlighted and the prompt of the external bounding box of the virtual model are displayed in the virtual teaching space.

(2-2-2) Motion of Virtual Model

The teacher places the obtained virtual model at a certain position in the virtual scene or real teaching space through translation, rotation and scaling. The virtual model is prevented from passing through tables, chairs, teacher and students in the real teaching space or relevant virtual objects in the virtual scene by using the collision detection algorithm.

An intersection situation of a bounding box A and a plane P is determined by comparing a size of $r_i$ and s to detect whether the collision occurs between the bounding box A and the plane P. A computational formula of $r_i$ is expressed as follows:

$$r_i = (V_i - C) \cdot n = (C \pm e_0 u_0 \pm e_1 u_1 \pm e_2 u_2 - C) \cdot n = (\pm e_0 u_0 \pm e_1 u_1 \pm e_2 u_2) \cdot n;$$

where a vector n is a normal vector of the plane P; C is a center of the bounding box A; a vector $u_i$ ($0 \le i \le 3$) is a local coordinate axis with C as an origin; a scalar $e_i$ ($0 \le i \le 3$) is a half of a length of three sides of the cuboid bounding box A; $V_i$ is 8 vertices of the bounding box A, and $V_i = C \pm e_0 u_0 \pm e_1 u_1 \pm e_2 u_2$ ($0 \le i \le 7$); s is a distance from C to P; and $r_i$ ($0 \le i \le 7$) is weight of a distance between $V_i$ and C along the vector n.

When $-r \le s \le r$, the bounding box intersects A with the plane P, which is considered that the virtual model in the bounding box A collides with the plane P.

(2-2-3) Autonomous Movement of Virtual Model

The teacher sets key motion nodes for the virtual model. The virtual model avoids the obstacles in the virtual scene by using the A* algorithm. A shortest path between adjacent nodes of the virtual model is calculated by using the 3D Dijkstra algorithm. The virtual model autonomously moves to avoid corresponding occlusion objects by applying a path finding navigation algorithm.

(2-3) Construction of Motion Prompt Mechanism

A transparent 3D external bounding box, a text prompt and an arrow prompt are added in a hybrid-augmented teaching environment by using a Simulated CAVE method. A third-person perspective is provided to support the teacher to follow the virtual model to move, so as to observe a moving law of the virtual model. A navigation map is generated to help the teacher master a global content of the virtual scene and navigation and positioning are facilitated.

(2-3-1) Setting of Motion Prompt

Figure 6:
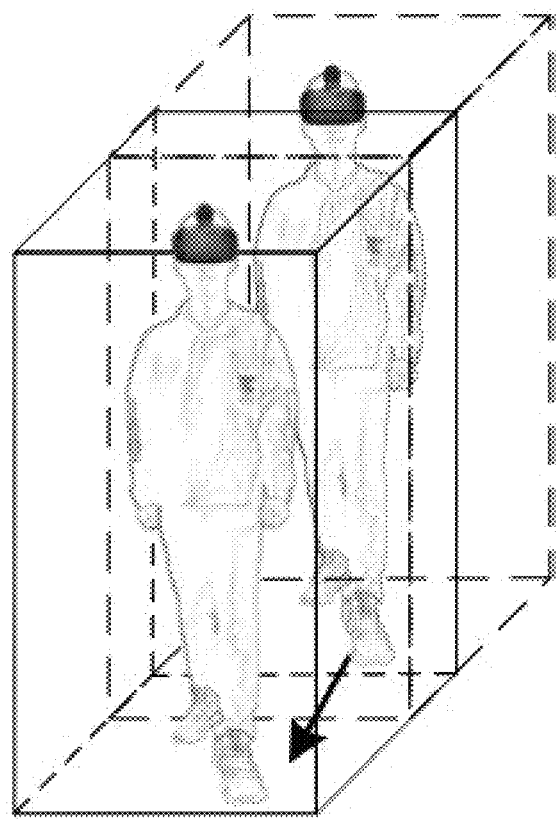
FIG. 6 is a schematic diagram of a three-dimensional (3D) rectangular frame centered on the teacher according to an embodiment of the present disclosure.

The transparent 3D external bounding box and the arrow prompt are added centered on the teacher in the hybrid-augmented teaching environment by using the Simulated CAVE method considering a phenomenon that the teacher frequently moves and is easy to lose direction sense. The 3D external bounding box moves and rotates with the teacher. The teacher is always at the center of the external bounding box, and the prompt of an instrument panel is updated on an upper right corner of the external bounding box directly in front of the teacher. FIG. 6 shows the arrow prompt with an offset of 300 from a current starting point.

(2-3-2) Switching of Third-Person Perspective

First-person and third-person perspective options are added in the hybrid-augmented teaching environment, where the third-person perspective supports the teacher to follow the virtual model to move, so as to observe the law of moving the virtual model, such as walking, swinging arms, grasping, and raising the head. When the teacher manipulates the virtual model through gesture and sight line, an operating mechanism of the virtual model can be presented through the third-person perspective, such as an instant transmission and the movement gain.

(2-3-3) Construction of Navigation Map

Figure 7:
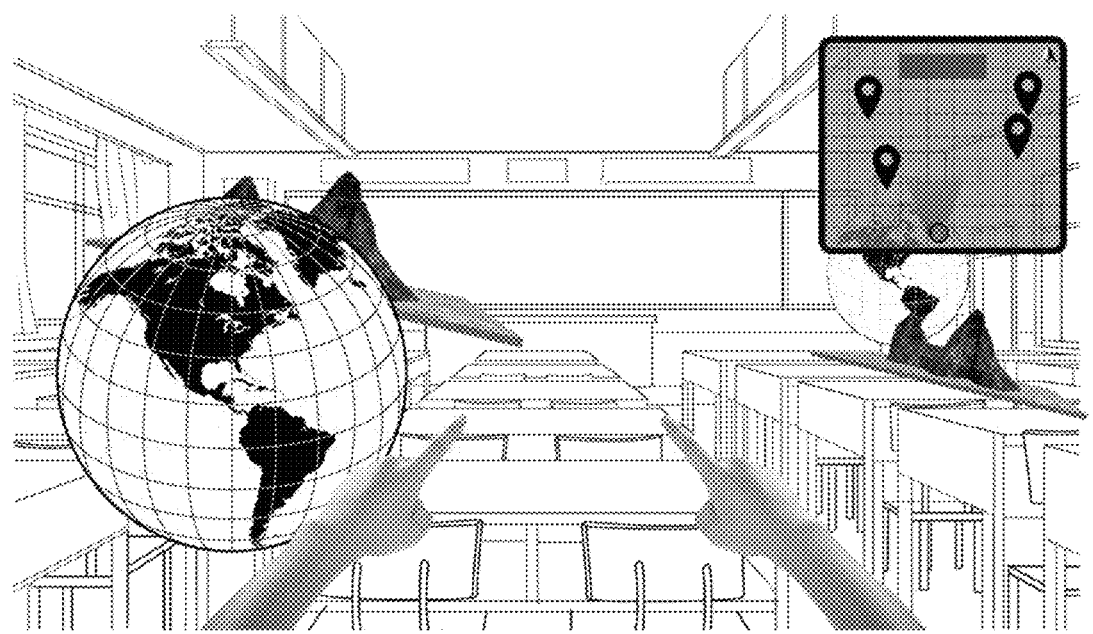
FIG. 7 is a schematic diagram of a navigation map of a teaching environment from a top view according to an embodiment of the present disclosure.
Figure 8:
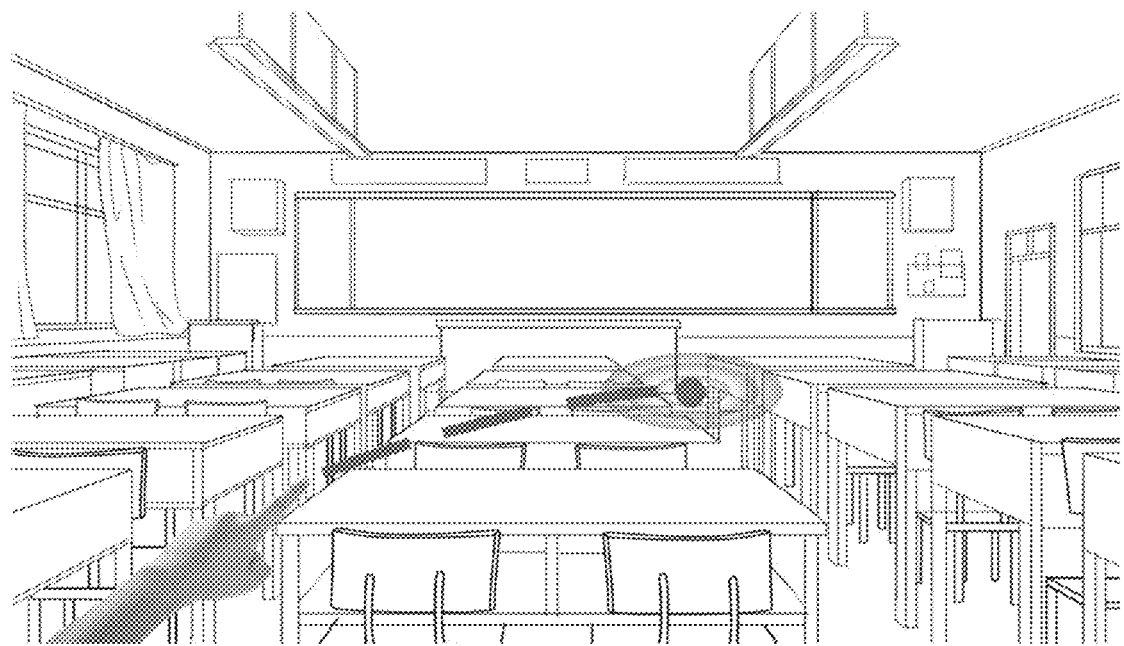
FIG. 8 is a schematic diagram of a transmit point of a preset virtual space according to an embodiment of the present disclosure.

The navigation map of the hybrid-augmented teaching environment from a top view is generated according to the position and orientation of the teacher. As show in FIG. 7, the distribution position and orientation prompt information of the virtual model comprising mountain and earth are marked on the navigation map to help the teacher master the global content of the virtual scene, facilitating navigation and position and interaction with the virtual scene.

(3) Fusion of Movement

A transition between different transmission scenes is performed by adopting transparent gradient modes of texture and colors. The teacher is supported to select important and difficult contents to explain by a preview screen, an automatic path finding algorithm and a backtracking mechanism. Fusion representation of the teacher is enhanced in the moving process by adopting a collision feedback, a haptic feedback and a visual feedback.

(3-1) Generation of Fast Transmission Mechanism

A position of a transmit point is selected and set in the hybrid-augmented teaching environment according to the series of motion response rules and a motion mechanism of the virtual model. The teacher is assisted to adapt to spatial orientation and layout of a new scene by using representations of highlighting and special color in a transmission process. The transition between different transmission scenes is performed by adopting transparent gradient modes of texture and color.

(3-1-1) Preset of Transmit Point of Virtual Teaching Space

According to teaching needs, a gaze focus of the teacher is positioned by eye tracking. A spatial position of the transmit point is selected and set, so as to avoid overlapping of the transmit point with objects in the virtual teaching space or the real teaching space. A highlighted and transparent circular mark is added on the transmit point and updated to the map synchronously, where after clicking the circular mark, it will be switched and transmitted to the virtual scene corresponding to the transmit point.

(3-1-2) Visual Transition of Scene Transmission

Vectors of the teacher's gaze direction and light direction are obtained by transition modes of fading in and out and fast blur animation in the transmission process. Objects in a new scene, such as desks, chairs, virtual teaching aids, are highlighted by a Fresnel method. Images of the new scene is highlighted by adopting special colors to help the teacher adapt to the spatial orientation and layout of the new scene, so as to reduce a cognitive load after the virtual scene switches. A Fresnel approximation formula is expressed as follow:

$$F=F_0+(1-F_0)*(1-\text{dot}(v,n))^x \, ;$$

where $n$ is a surface normal vector; $v$ is viewing angle vector; $F_0$ is a reflection coefficient; and $x$ is an enhancement time, which controls a size of Fresnel's influence area.

(3-1-3) Fitting of Transitional View

Content of a transitional field of view between transmission scenes is fitted according to duration and position in combination with body posture, head orientation, movement track and visual field of view of the teacher by adopting the transparent gradient modes of texture and color to realize a natural transition when the transmission scene is switched.

(3-2) Construction of Mechanism for Enhancing Sense of Direction

An instrument panel of the external bounding box and the arrow prompt function are added to assist the teacher to re-determine position and orientation according to a transmission mechanism and a motion prompt mechanism by using the Simulated CAVE method. A preview image of the transmission scene is generated and the obstacles are avoided by an automatic path finding algorithm. A backtracking mechanism is established to support the teacher to select important and difficult contents to explain.

(3-2-1) Redirection of Virtual Teaching Space

Figure 9:
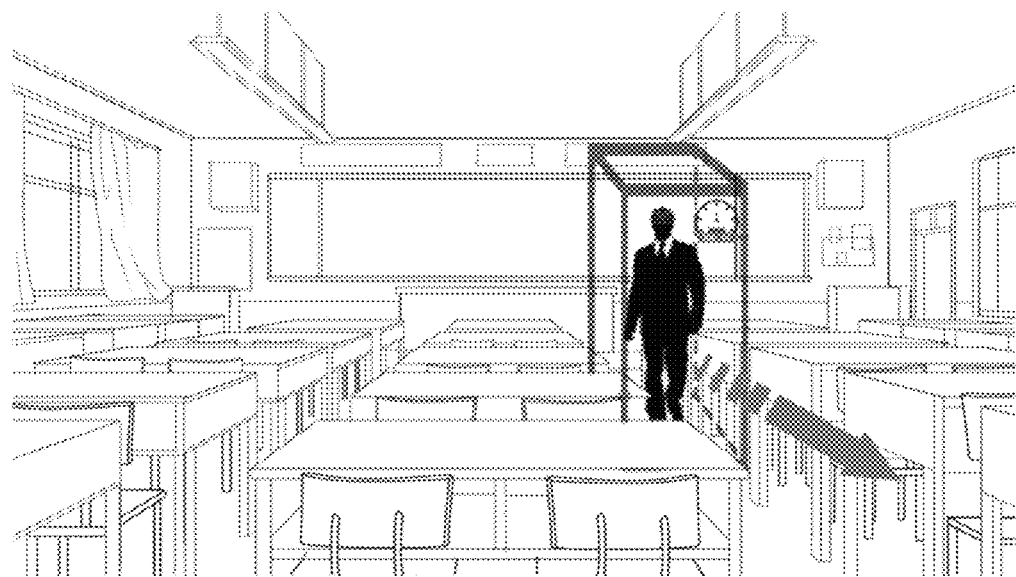
FIG. 9 is a schematic diagram of a re-direction prompt of the virtual space according to an embodiment of the present disclosure.

When transmitting transferring to a new virtual scene or moving to the boundary area of the virtual teaching space, the instrument panel and the arrow prompt of the external bounding box are updated in real time according to the Simulated CAVE method to show the moving direction and distance of the teacher. As show in FIG. 9, the arrow indicates the moving direction of the teacher to remind the teacher to turn at the boundary. The dashboard in front of the teacher displays the offset with respect to the initial position to assist the teacher to reposition the position and gesture of the teacher in the virtual teaching space.

(3-2-2) Transmission Preview

A preview image of each transmission scene is generated in the hybrid-augmented teaching environment. The teacher can select different transmission scenes through the preview image. A preview image of the virtual scene after transmission is generated according to position and gazing direction of the teacher. The teacher avoids the obstacles in the new scene according to parameters of an initial state by adopting the automatic path finding algorithm.

(3-2-3) Motion Backtracking

Figure 10:
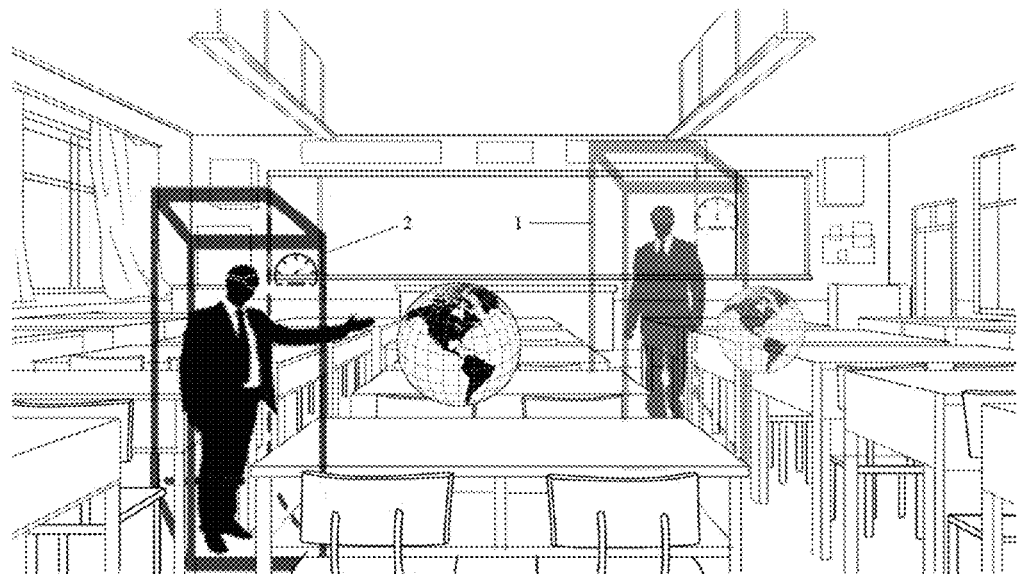
FIG. 10 schematically illustrate a backtracking mechanism according to an embodiment of the present disclosure, where position 1: a current state of an earth model; and position 2: a last backtracking point of the earth model based on a timeline sequence.

A position and state of the teacher at a certain moment in the virtual scene are recorded as backtracking points, such as position, posture and gazing direction of the teacher, distribution of the virtual model, gesture and state of motion of each of models. According to a time development order, the backtracking points are organized based on a linked list structure, and a logical relationship among the backtracking points is established. The backtracking points are switched to realize switching of the virtual scene in a series of important moments, so as to support the teacher to choose the corresponding important and difficult contents for explanation. An effect of the backtracking mechanism is shown in FIG. 10, where position 1 is a current state of an earth model, and position 2 shows the earth model presenting in a light and shadow effect and is a last backtracking point, which corresponds to the position, rotation angle, motion state and zoom scale of the earth model at that time.

(3-3) Creation of Motion Feedback Mechanism

A collision feedback is triggered by using images, sounds and vibrations when the teacher collides with the virtual model according to an enhancement mechanism of a motion direction sense. A haptic feedback is calculated by capturing a transient value of motion of the virtual model to effectively avoid a "penetration" phenomenon when selecting the virtual model. The movement of the teacher is represented by using a visual feedback effect of the line segment, highlighting and particle effect, so as to realize fusion of movements of the teacher in the teaching scene.

(3-3-1) Creation of Collision Feedback Mechanism

Figure 11:
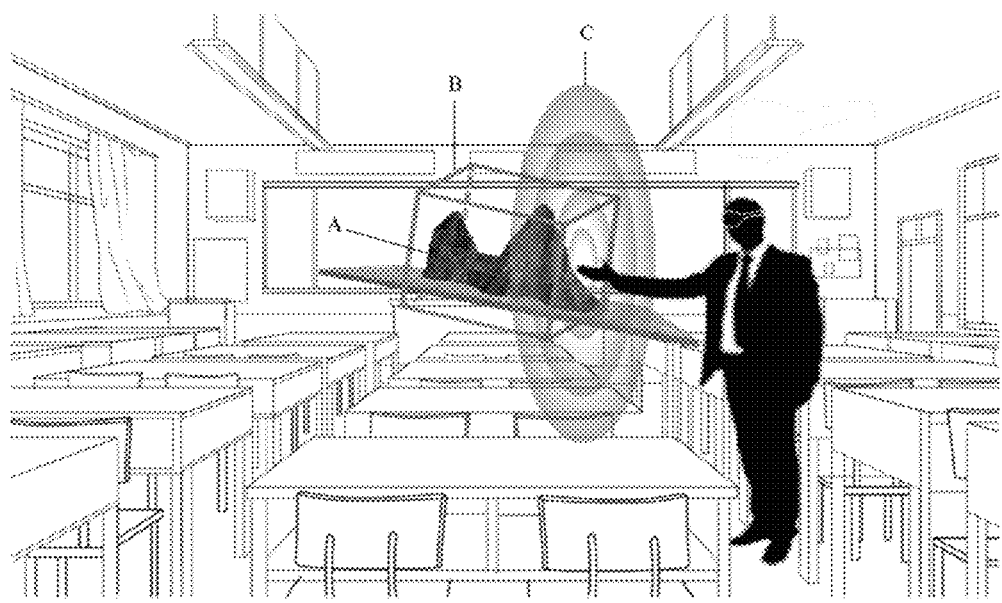
FIG. 11 schematically shows a feedback triggered by a collision between the teacher and a mountain model at a level exceeding the threshold, where A is the mountain model, B is a collision bounding box of the mountain model; and C is audio-visual feedback effect of the collision.

A collision threshold is set between the teacher and a relevant virtual model according to a moving range of the hybrid-augmented teaching environment and layout information of the virtual model. As shown in FIG. 11, in the teaching process, when the teacher interacts with the virtual mountain model at position A, an audio-visual feedback effect at position C is triggered once the collision occurs between the teacher and the virtual mountain model at position B and a collision value exceeds the collision threshold, where the audio-visual feedback effect includes images, sounds and vibrations.

(3-3-2) Creation of Haptic Feedback Mechanism

Figure 12:
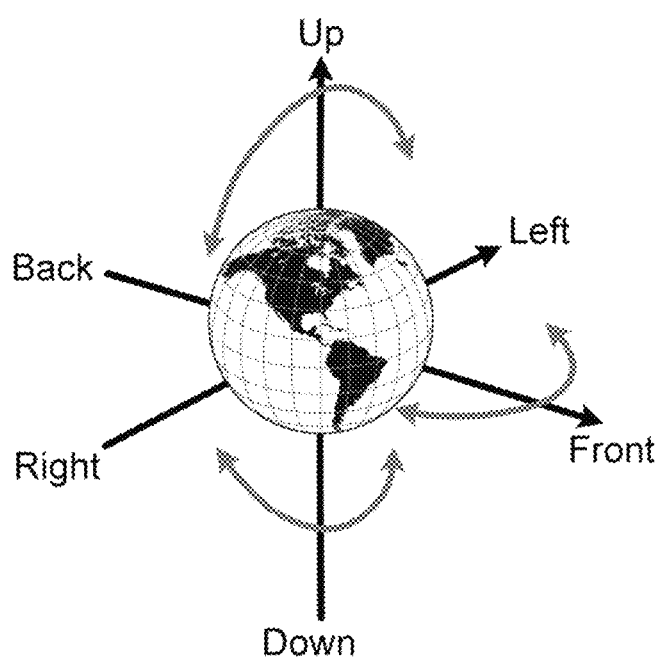
FIG. 12 is a schematic diagram of a motion trajectory of a virtual earth in a form of 9-DOF according to an embodiment of the present disclosure.

Parallel modules with different update frequencies are generated by using a multi-rate method to record gaze, gesture and body movement of the teacher. The haptic feedback is calculated by capturing a moving transient value of the teacher. A motion trajectory of the virtual model is recorded in a form of 9-DOF. As shown in FIG. 12, a motion trajectory of a virtual earth is recorded in teaching of revolution of the earth and feedback force and torque are provided to avoid the "penetration" phenomenon when capturing the virtual model.

(3-3-3) Creation of Visual Feedback Mechanism

A process of observing direction or moving an object of the teacher is recorded by using the line segment. Interaction between the teacher and relevant virtual objects is recorded by highlighting and special color. Specifically, a gesture trajectory of the teacher is recorded when the teacher writes on the blackboard. Content of a relevant area is displayed by using the special color. The feedback effect is represented when the teacher hits or touches the virtual objects using the particle effect.

The partial content is not described in detail in this application, which is known to those skilled in the prior art.

Described above are only preferred embodiments of this application, and are not intended to limit this application. Any modification, replacement and improvement made without departing from the spirit and principle of this application shall fall within the protection scope of this application.

What is claimed is:

1. A fusion method for movements of a teacher in a teaching scene, comprising:
   (1) performing normalization on movements of the teacher in a real teaching space and a virtual teaching space;

(2) perceiving the movements of the teacher in the real teaching space and the virtual teaching space; and
(3) fusing the movements of the teacher in the teaching scene;

wherein the step (1) is performed through steps of:
(1-1) collecting a three-dimensional (3D) surface model of the real teaching space by a depth camera; dividing the virtual teaching space into different grid areas by a Spatial Mapping technology; and extracting a boundary plane of the virtual teaching space and adding a collider to the boundary plane to define a moving range of the teacher and a moving range of the 3D surface model;
(1-2) calculating a scale transformation between the virtual teaching space and the real teaching space according to the moving range of the teacher and the moving range of the 3D surface model; obtaining a position and an orientation of a virtual model in the real teaching space by using parallel ranging and imaging; and determining a position and an orientation of the teacher in the real teaching space by using an inertial navigation technology to realize a position conversion between the virtual teaching space and the real teaching space; and
(1-3) performing a weighted calculation to obtain a gain scaling factor in combination with collected distance, speed and time of the movements of the teacher according to the moving range of the teacher and the moving range of the 3D surface model by using an Eye-Level Scaling method; and calculating a movement gain of the teacher in the virtual teaching space by using a Seven-League Boots technology to realize the normalization of the movements of the teacher in the virtual teaching space and the real teaching space;

the step (2) is performed through steps of:
(2-1) capturing movements of torso, gesture and head of the teacher by using a recognition-tracking algorithm; constructing a series of motion response rules to unify movement effects in the virtual teaching space and the real teaching spaces; and marking a moving process of the teacher with a line segment and highlighting a selected state of the virtual model;
(2-2) selecting the virtual model by using an external bounding box detection algorithm; preventing the virtual model from passing through relevant virtual objects during the moving process by using a collision detection algorithm; letting the virtual model avoid obstacles in a virtual scene by using an A* algorithm; and letting the virtual model autonomously move by using a 3D Dijkstra algorithm; and
(2-3) adding a transparent 3D external bounding box, a text prompt and an arrow prompt in a hybrid-augmented teaching environment by using a Simulated CAVE method; providing a third-person perspective to support the teacher to follow the virtual model to move, so as to observe a moving law of the virtual model; and generating a navigation map to help the teacher master a global content of the virtual scene, facilitating navigation and positioning;

the step (3) is performed through steps of:
(3-1) selecting and setting a position of a transmit point in the hybrid-augmented teaching environment according to the series of motion response rules and a motion mechanism of the virtual model; assisting the teacher to adapt to spatial orientation and layout of a new scene by using representations of highlighting and special color in a transmission process; and performing a transition between different transmission scenes by adopting transparent gradient modes of texture and color;
(3-2) adding an instrument panel of the external bounding box and an arrow prompt function to assist the teacher to re-determine position and orientation according to a transmission mechanism and a motion prompt mechanism by using the Simulated CAVE method; generating a preview screen of a transmission scene and avoiding the obstacles by an automatic path finding algorithm; and establishing a backtracking mechanism to support the teacher to select important and difficult contents to explain; and
(3-3) triggering a collision feedback by using images, sounds and vibrations when the teacher collides with the virtual model according to an enhancement mechanism of a motion direction sense; calculating a haptic feedback by capturing a transient value of motion of the virtual model to avoid a "penetration" phenomenon when selecting the virtual model; and representing movement of the teacher by using a visual feedback effect of line segment, highlighting and particle effect, so as to realize the fusion of movements of the teacher in the teaching scene.

2. The fusion method of claim 1, wherein the step (1-1) is performed through steps of:
(1-1-1) collecting point cloud data of the real teaching space by the depth camera; generating grids of a virtual surface model by using a 3D reconstruction technology; and dividing the 3D surface model into model objects comprising walls, floors, tables and chairs, according to spatial characteristics of the 3D surface model;
(1-1-2) establishing a world space coordinate system with meter as unit and a center of the real teaching space as a coordinate origin; describing the hybrid-augmented teaching environment by using a right-handed coordinate system; and dividing the virtual teaching space into different grid areas by the Spatial Mapping technology; and
(1-1-3) obtaining boundary planes of the virtual teaching space in horizontal, longitudinal and vertical directions by traversing to correspondingly create virtual surfaces; and creating the collider by using hierarchical bounding volumes to define the moving range of the teacher and a moving range of a virtual object in the hybrid-augmented teaching environment;

the step (1-2) is performed through steps of:
(1-2-1) calculating the scale transformation between the virtual scene and the real teaching space according to the moving range of the teacher and the moving range of the virtual object; and enabling a transformation of position and range between the teacher, the virtual model and the environment in the virtual teaching space and the real teaching space by setting a homogeneous coordinate W, wherein W>1 means zoom out and W<1 means zoom in;
(1-2-2) positioning a position coordinate (x, y, z) and an orientation posture (tx, ty, tz) of the virtual model in the real teaching space by using the parallel ranging and imaging technology; and calculating and updating in real time information of the virtual model in the real teaching space when the position and orientation of the virtual model change; and
(1-2-3) calculating a position coordinate (x', y', z') and an orientation posture (tx', ty', tz') of the teacher in the real teaching space by using the inertial navigation technology with help of an accelerometer and a gyroscope;

and calculating and positioning changes in the position and the orientation of the teacher with respect to surrounding environment by dead reckoning;

the step (1-3) is performed through steps of:

(1-3-1) performing the weighted calculation to obtain the gain scaling factor according to scale mapping between the virtual teaching space and the real teaching space by using the Eye-Level Scaling method in combination with the collected distance, speed and time of the movements of the teacher to calculate changes in the position and the orientation of the teacher in the virtual teaching space and the real teaching space;

(1-3-2) letting the teacher observe the virtual object in the virtual scene from a giant perspective or a dwarf perspective; and calculating a coordinate of the virtual model during the moving process using a coordinate conversion formula according to parameters of the scale transformation between the virtual teaching space and the real teaching space to realize the normalization of relevant objects in the virtual teaching space and the real teaching space; and (1-3-3) tracking and capturing motion and position data of the teacher in teaching activities; following changes of field of view of the teacher in the real teaching space; and calculating accumulated position and posture of the teacher in the virtual teaching space by using the Seven-League Boots technology to obtain changes of the movement gain of the teacher.

3. The fusion method of claim 1, wherein the step (2-1) is performed through steps of:

(2-1-1) tracking torso posture and movements of the teacher in a teaching process by using a BlazePose algorithm; positioning and recognizing a gesture and movement of the teacher by using the BlazePlam algorithm; and determining a range of a field of view and an focused object of the teacher based on head pose estimation and eye tracking;

(2-1-2) constructing the motion response rules in the hybrid-augmented teaching environment according to collected movement actions of the teacher to unify a movement gain of the virtual teaching space and the real teaching space; and enabling rapid switching of the virtual scene by an instant transmit strategy;

(2-1-3) tracking actions of the teacher in the real teaching space, and drawing the line segment in the virtual scene to dynamically display a moving path of the teacher in real time; and highlighting the virtual model to trigger a prompt of the selected state when a sight line and a gesture of the teacher move to the collider of the virtual model;

the step (2-2) is performed through steps of:

(2-2-1) letting the teacher choose the virtual model in a virtual environment by interaction modes of gaze and gesture according to teaching needs; selecting the virtual model by using the external bounding box detection algorithm; and highlighting the selected virtual model and displaying a prompt of an external bounding box of the virtual model in the virtual teaching space;

(2-2-2) letting the teacher place the selected virtual model at a certain position in the virtual scene or the real teaching space through translation, rotation and scaling; and preventing the virtual model from passing through tables, chairs, teacher and students in the real teaching space or relevant virtual objects in the virtual scene by using the collision detection algorithm; and (2-2-3) setting, by the teacher, key motion nodes for the virtual model; letting the virtual model avoid the obstacles in the virtual scene by using the A* algorithm; calculating a minimal path between adjacent nodes of the virtual model by using the 3D Dijkstra algorithm; and letting the virtual model autonomously move to avoid corresponding occlusion objects by applying a path finding navigation algorithm;

the step (2-3) is performed through steps of:

(2-3-1) adding the transparent 3D external bounding box centered on the teacher in the hybrid-augmented teaching environment by using the Simulated CAVE method considering a phenomenon that the teacher frequently moves and is easy to lose direction sense; letting the 3D external bounding box move with the teacher; and updating text prompt and arrow prompt on an upper right corner of the external bounding box directly in front of the teacher;

(2-3-2) adding first-person and third-person perspective options in the hybrid-augmented teaching environment, wherein the third-person perspective supports the teacher to follow the virtual model to move, so as to observe the moving law of the teacher; and presenting an operating mechanism of the virtual model through the third-person perspective when the teacher manipulates the virtual model through gesture and sight line; and (2-3-3) generating the navigation map of the hybrid-augmented teaching environment from a top view according to the position and orientation of the teacher; and marking a distribution position and orientation prompt information of the virtual model on the navigation map to help the teacher master the global content of the virtual scene, facilitating navigation and position and interaction with the virtual scene.

4. The fusion method of claim 1, wherein the step (3-1) is performed through steps of:

(3-1-1) positioning a gaze focus of the teacher by eye tracking according to teaching needs; selecting and setting a spatial position of the transmit point; and adding a highlighted and transparent circular mark on the transmit point, wherein after clicking the circular mark, it will be switched and transmitted to the virtual scene corresponding to the transmit point;

(3-1-2) presenting a new view image by highlighting and special color through fade in-out and quick blur animation transition in the transmission process to help the teacher adapt to the spatial orientation and layout of the new scene, so as to reduce a cognitive load after the virtual scene is switched; and (3-1-3) fitting content of a transitional field of view between transmission scenes according to duration and position in combination with body posture, head orientation, movement track and visual field of view of the teacher by adopting the transparent gradient modes of texture and color to realize a natural transition when the transmission scene is switched;

the step (3-2) is performed through steps of:

(3-2-1) when transmitting to a new virtual scene or moving to the boundary area of the virtual teaching space, updating the instrument panel and the arrow prompt of the external bounding box in real time according to the Simulated CAVE method to assist the teacher to re-determine the position and orientation of the teacher in the virtual teaching space;

(3-2-2) generating a preview screen of each transmission scene in the hybrid-augmented teaching environment; generating a preview screen of the virtual scene after transmission according to position and gazing direction of the teacher; and letting the teacher avoid the obstacles in the new scene according to parameters of an initial state by adopting the automatic path finding algorithm; and (3-2-3) establishing the backtracking mechanism; recording a position, posture and gazing direction of the teacher before moving by a backtracking point to backward deduce a position and state of the teacher at a certain moment in the virtual scene; and switching the backtracking point to support the teacher to choose the corresponding important and difficult contents for explanation;

the step (3-3) is performed through steps of:

(3-3-1) setting a collision threshold between the teacher and a relevant virtual model according to a moving range of the hybrid-augmented teaching environment and layout information of the virtual model; and triggering the collision feedback by using images, sounds and vibrations when the teacher collides with the virtual model and a collision exceeds the collision threshold;

(3-3-2) generating parallel modules with different update frequencies by using a multi-rate method to record gaze, gesture and body movement of the teacher; calculating the haptic feedback by capturing a moving transient value of the teacher; recording a motion trajectory of the virtual model in a form of 9-DOF; and providing feedback force and torque to avoid the "penetration" phenomenon when capturing the virtual model; and (3-3-3) recording a process of observing direction or moving an object of the teacher by using the line segment; recording interaction between the teacher and relevant virtual objects by highlighting and special color; display content of a relevant area by using the special color; and representing the feedback effect when the teacher hits or touches the virtual objects using the particle effect.

* * * * *